May 8, 1951  J. G. SAWYER  2,552,118
BLOWER
Filed March 27, 1947  5 Sheets-Sheet 1

INVENTOR.
JAMES G. SAWYER
BY
Bates, Teare, & McBean
ATTORNEYS

May 8, 1951 J. G. SAWYER 2,552,118
BLOWER
Filed March 27, 1947 5 Sheets-Sheet 2

INVENTOR.
JAMES G. SAWYER
BY
Bates, Peare & McBean
ATTORNEYS

May 8, 1951     J. G. SAWYER     2,552,118
BLOWER

Filed March 27, 1947     5 Sheets-Sheet 3

INVENTOR.
JAMES G. SAWYER
BY
Bates, Peare, & McBean
ATTORNEYS

May 8, 1951   J. G. SAWYER   2,552,118
BLOWER
Filed March 27, 1947   5 Sheets-Sheet 4

INVENTOR.
JAMES G. SAWYER
BY
Bates, Peare, & McBean
ATTORNEYS

May 8, 1951 J. G. SAWYER 2,552,118
BLOWER
Filed March 27, 1947 5 Sheets-Sheet 5

INVENTOR.
JAMES G. SAWYER
BY
Bates, Teare, & McBean
ATTORNEYS

Patented May 8, 1951

2,552,118

UNITED STATES PATENT OFFICE 2,552,118

BLOWER

James G. Sawyer, Williamsville, N. Y., assignor to Buffalo Turbine Corporation, Buffalo, N. Y., a corporation of New York Application March 27, 1947, Serial No. 737,672

2 Claims. (Cl. 230—133)

This invention relates to a blower of turbine type having a rotating impeller within an external tubular shell having stationary straightening vanes between the region of the traveling blades and the discharge end of the shell. One of the objects of the invention is to provide a blower of this type so constructed and arranged that it may give a powerful blast while requiring comparatively small operating power. Another object of the invention is to provide a blower of this type so designed that it may be cheaply constructed and readily assembled. Still another object is to provide such a blower which may be operated with a minimum of noise notwithstanding the high speed of operation and the powerful blast delivered.

My blower is illustrated in the accompanying drawings, which show an approved embodiment thereof, and is hereinafter fully explained and the essential novel features are summarized in the claims.

Figure 1:
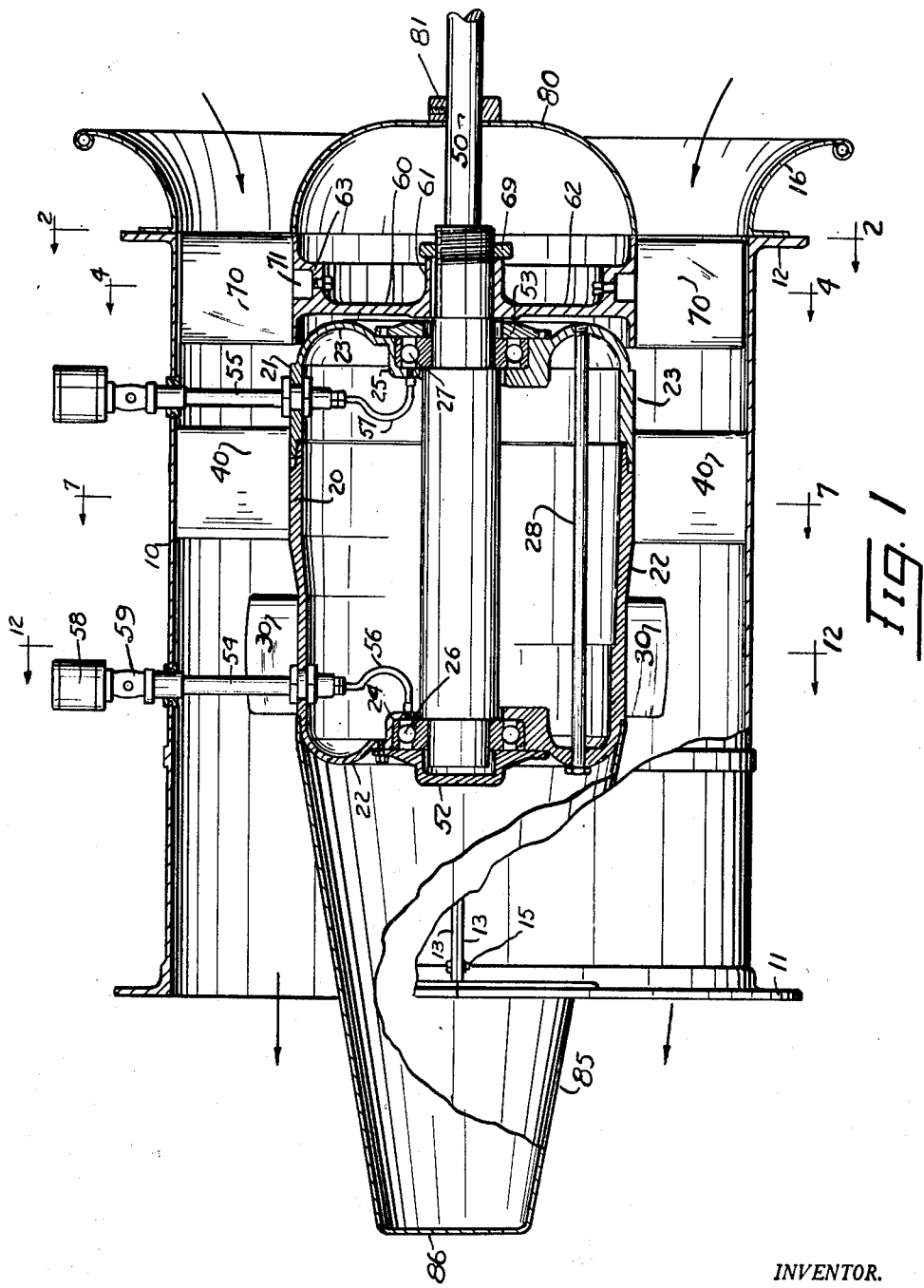
Figure 2:
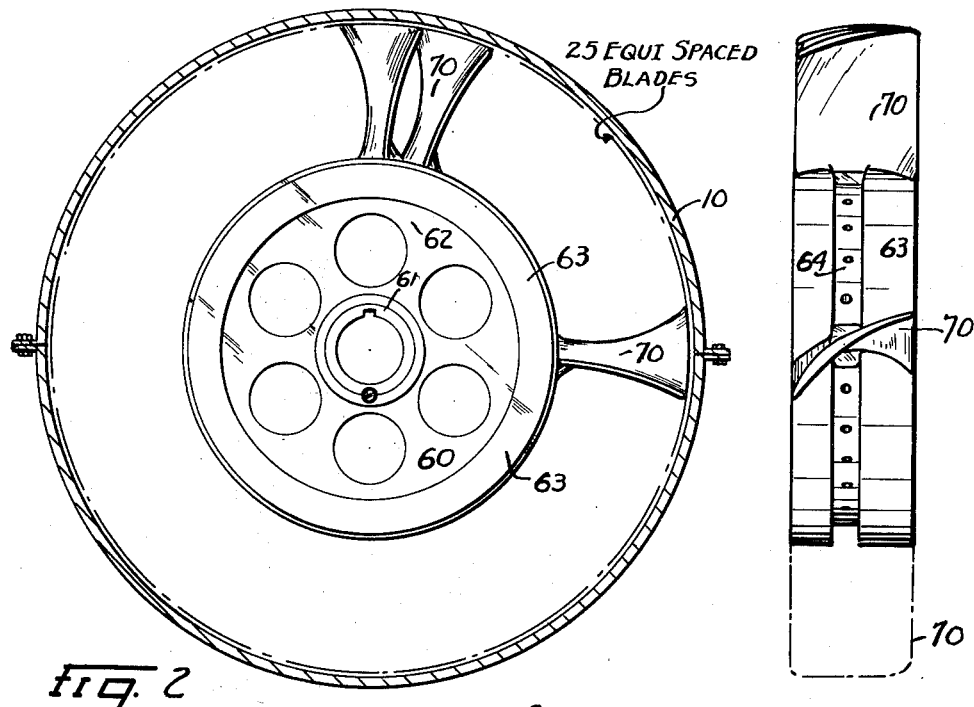
Figure 3:
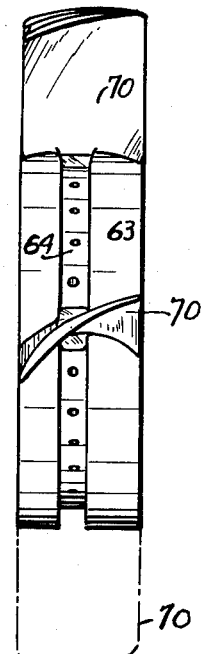
Figure 5:
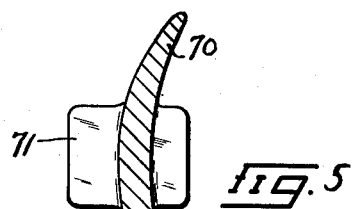
Figure 4:
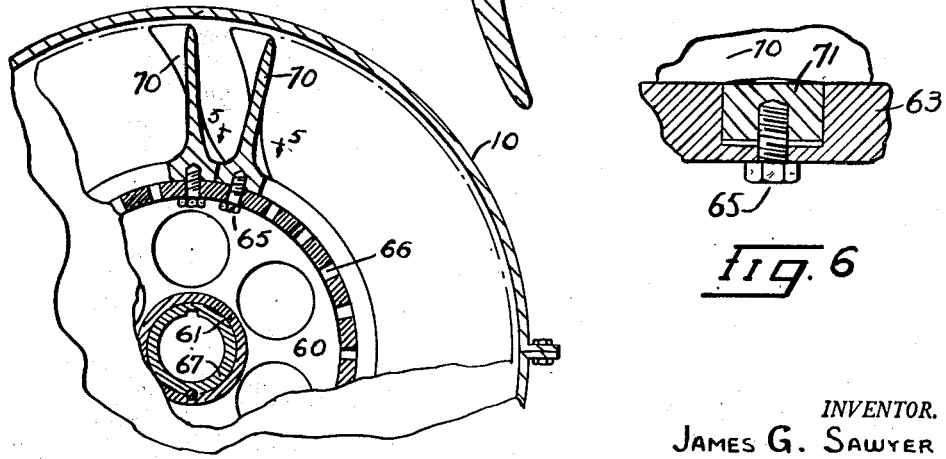
Figure 6:
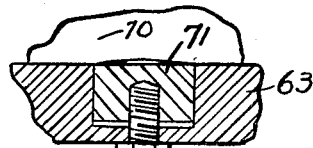
Figure 7:
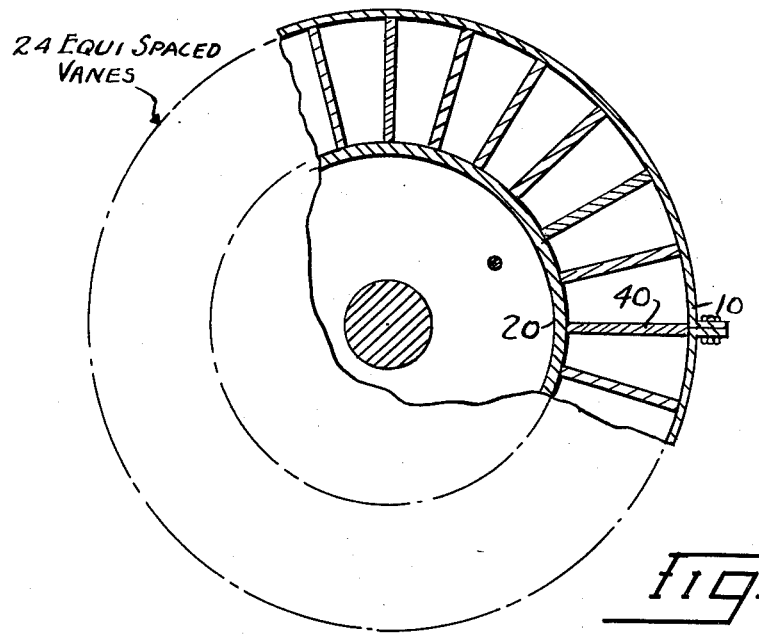
Figure 8:
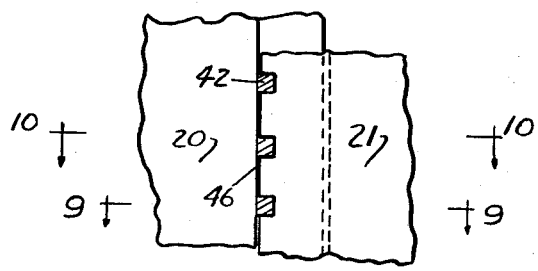
Figure 11:
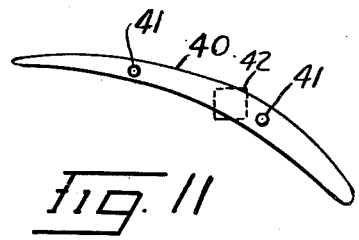
Figure 9:
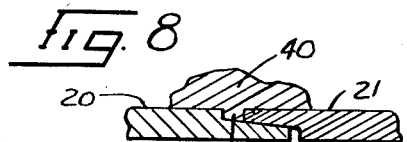
Figure 10:
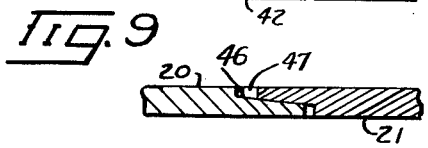
Figure 12:
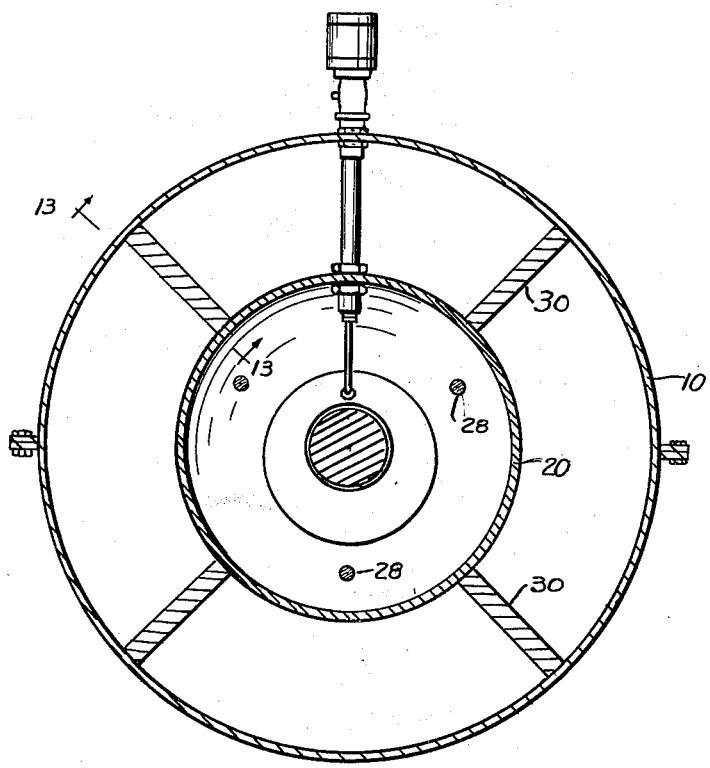
Figure 13:
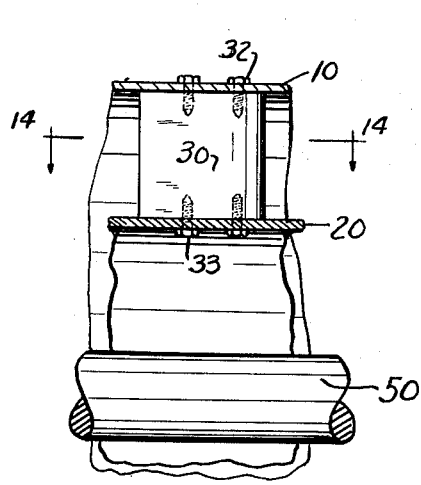
Figure 14:
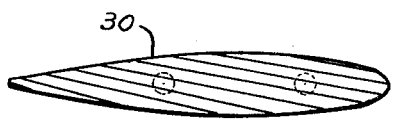
Figure 15:
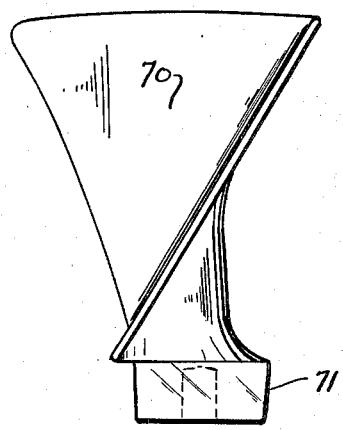
Figure 16:
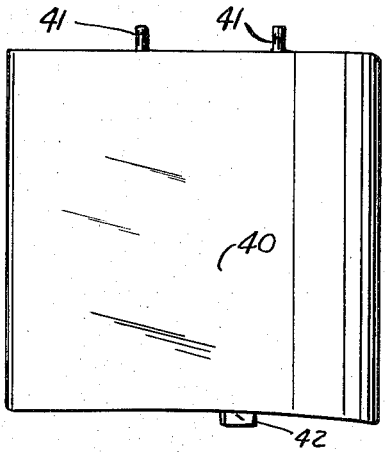
Figure 17:
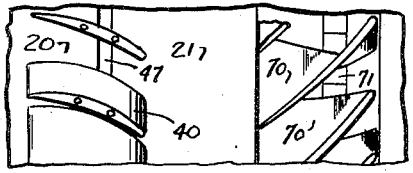
Figure 18:
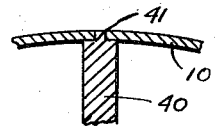

In the drawings, Fig. 1 is a side elevation of my blower, mostly in section and partly broken away; Fig. 2 is a cross section in a plane indicated by the line 2—2 on Fig. 1 looking toward the impeller, of which only a few of the blades are shown; Fig. 3 is a plan or edge view of the impeller with only two blades shown but with the location for others indicated; Fig. 4 is a radial cross section through the impeller, as indicated by the line 4—4 on Fig. 1, two of the blades being shown, and the position of the others being indicated; Fig. 5 is a cross section through one of the impeller blades, as indicated by the line 5—5 on Fig. 4; Fig. 6 is a detail illustrating the mounting of the impeller blades in the rotary hub of the impeller; Fig. 7 is a radial cross section through the straightening vanes, as indicated by the line 7—7 on Fig. 1; Fig. 8 is a fragmentary plan of two parts of a concentrically mounted drum which carries the bearings for the operating shaft and positions the inner ends of the straightening vanes; Figs. 9 and 10 are cross sections of the parts shown in Fig. 8, taken on the planes indicated by the correspondingly numbered lines; Fig. 11 is an edge view of one of the straightening vanes; Fig. 12 is a cross section through supports for the bearing carrier, as indicated by the line 12—12 on Fig. 1; Fig. 13 is a detail of this part of the construction, being a section in a plane indicated by the line 13—13 on Fig. 12; Fig. 14 is a cross section through one of the supporting blocks, indicated by the line 14—14 on Fig. 13; Fig. 15 is a side elevation of one of the impeller blades; Fig. 16 is a side elevation of one of the straightening vanes; Fig. 17 is a fragmentary longitudinal view just inside of the shell looking toward the axis of the blower; and Fig. 18 is an enlarged fragmentary cross section through the shell and one of the straightening vanes in a plane at right angles to Fig. 1.

What may be called the main frame of my blower comprises a tubular shell or shroud 10 having a cylindrical interior and preferably braced at its ends by outward flanges 11 and 12. This shell may conveniently be made in two semi-cylindrical parts each provided with an outward longitudinal flange 13 at the diametric edge, these flanges being secured together preferably by bolts, as indicated at 15. The end flange 12 preferably carries an entrance bell 16 to direct the air to the interior. The flange 11 at the discharge end may carry a suitable conduit, not shown, to direct the discharged air as desired. The longitudinal flanges 13 may be used as ledges to support the blower, or the end flanges 11 and 12 may be continued downwardly and form supports.

Rigidly mounted in the interior of the shell, and supported thereby as hereinafter explained, is a concentric member carrying the bearings for the operating shaft. This bearing carrier is a hollow drum having transverse ends carrying the bearings. The end members preferably curve into cylindrical walls which are connected by substantially cylindrical portions to complete the hollow drum.

As shown in Fig. 1, I prefer to make the drum of two cup-shaped members, one designated 20, having a cylindrical wall of considerable length and the other member 21 having a shorter cylindrical wall and overlapping that of the member 20. This drum is supported and positioned concentrically of the shell by several radial supports 30 and also by an annular set of straightening vanes 40 for the air stream, these parts to be hereinafter more fully described.

The transverse portion of each cup-shaped member 20 and 21 is preferably rounded outwardly as at 22 and 23 and then near the center diverted inwardly at 24 and 25 to form seats for the outer races of ball bearings 26 and 27. The cup-shaped members are shown as held together by longitudinal through bolts one of which is shown at 28 in Fig. 1, such bolts having heads outside of the member 20 and threaded at their opposite ends into the member 21.

The operating shaft 50 extends from a suitable driving mechanism, not shown, through the bell 16 and into the interior of the drum which carries the outer races of the ball bearings, the inner races being mounted on portions of the shaft and bearing against shoulders thereon.

At the discharge end of the bearing carrier, I provide a stationary cup-shaped fitting 52 secured to the drum member 20 and suitably housing the end portion of the shaft. Beyond the bearing 27, I provide an annular member 53 surrounding the shaft and secured to the outer face of the drum member 21. These two members 52 and 53 lock the outer races in their carrying cups and extending closely across the outer edge of the inner races so that the bearing is in effect completely housed. This feature enables oil to be retained in the space about the balls of the bearings.

Fig. 1 indicates means for supplying oil to the bearings. This means comprises a pair of vertical tubes 54 and 55 extending from outside the shell inwardly across the air space and into the interior of the drum, where they are connected by suitable extensions 56 and 57 to the ball spaces of the bearings. Suitable oil cups 58 are indicated as mounted on the outer ends of the tubes controlled by suitable cocks 59.

The shaft carries the impeller close to the cup 21 of the bearing drum. This impeller comprises a hub 60 rigidly mounted on the shaft and a set of blades 70 carried by the hub at its periphery. This construction is shown in Figs. 1 to 6 inclusive. The hub 60 has a central sleeve portion 61 carried by the shaft, then a radial web 62 (preferably lightened by openings) and then an annular rim 63 which carries the blades 70 as about to be explained.

The rim 63 spreads in each direction and has formed in it an outwardly facing annular groove 64 having flat side walls. Each of the blades 70 is provided with a boss 71 at its inner edge, Figs. 5, 6 and 15. This boss is rectangular in cross section while the ends thereof are in planes radial of the hub. Accordingly, a complete set of blades mounted on the hub, having their adjacent bosses abutting, entirely fill the groove 64. The blades are held in place on the hub by cap screws 65 which pass through equi-distant openings 66 in the rim of the hub, as indicated in Figs. 4 and 6.

The lugs 71 on the blades preferably do not quite reach the bottom of the groove in the hub, so that when the blade is drawn tightly into place by the screw 65, the inner edges of the blade are brought into firm abutment with the outer face of the hub rim. This clearance also enables the inner face of the lug 71 to be straight instead of arcuate, which is a convenience in manufacture.

For simplicity of illustration I have omitted most of the blades in Figs. 2, 3 and 4. Fig. 2 indicates, however, that a complete set of blades entirely surrounds the hub. In Fig. 2 I have noted that twenty-five blades are employed. I do not confine myself to this exact number of blades, but for reasons hereinafter explained it is desirable to have the number of blades slightly different from the number of straightening vanes and this is illustrated in the drawings by the indication in Fig. 7, that twenty-four straightening vanes are employed.

The blades 70 are each in the form of a twisted or warped rectangle so as to be concave on one side and convex on the other side, as indicated in Figs. 5 and 15. The straightening vanes 40 are also of approximately rectangular outline and are concavo convex. The concave side of the blades faces the convex side of the vanes as indicated in Fig. 17. These vanes are of substantially the form shown in Figs. 11 and 16. They are thickened intermediately but come to reduced edges at the front and the rear, being bound by two cylindrical surfaces of different radii, as shown in Fig. 11. To reduce weight I prefer to make the hub and the blades of aluminum or light metal. If this hub is an aluminum casting I may internally reinforce the central sleeve by a steel bushing rigidly secured to the hub and keyed to the shaft, as shown at 67 in Fig. 4.

The straightening vanes 40 are located in diagonal position in an annular row beyond the impeller blades and at their outer ends abut the shell 10 and at their inner ends abut the bearing drum. I secure the blades in this position very simply by providing the vanes with pins 41, Fig. 11, on their outer edges which occupy openings in the shell and with square bosses 42 at their inner edges which are mounted in recesses in the bearing drum.

The bearing drum recesses are shown as provided by forming a series of rectangular notches 47 in the end of the wall of the cup member 21. When this cup member is nested over the member 20, as shown in Figs. 8, 9 and 10, the notches coacting with the shoulder 46 on the member 20 form square recesses to receive the bosses 42. When the two cup members are drawn together by their bolts 28 the bosses 42 are all clamped in position and hence form a positioner and support for the bearing drum.

The cup member 20 of the bearing drum is rigidly supported by the shell 10 by a few radial supports, four being shown at 30 in Fig. 12. These supports while having sufficient body to hold the bearing drum firmly are streamlined or of trout-shape in cross-section, as shown in Fig. 14, so as to present little resistance to the advancing stream of air. At their outer edges they are secured to the shell 10 by cap screws 32 and at their inner ends to the cup member 20 by cap screws 33.

In assembling the parts described, the two members of the shell are first joined together. The cup member 20 is then mounted in place within the shell by means of the supporting blocks 30. Thereafter the straightening vanes 40 are placed with their projecting studs 41 extending into openings in the shell and then the cup member 21 is drawn axially into place by the clamping bolts 28 to bind the lugs 42 of the straightening vanes. The entire drum is thus rigidly mounted axially within the shell. At a proper time before the mounting is completed the shaft and bearings are put in place as well as the oil tubes.

Either before or after mounting the shaft the impeller is placed thereon, being slipped over the driving end of the shaft until it abuts an enlargement thereon, after which it is clamped tightly in place by the clamping nut 69 screwing onto the threaded portion of the shaft.

A cup-shaped shield 80 is preferably mounted on the shaft, being clamped by a central collar 81 the wall of this shield directing the incoming air to the annular path of the blades. Also, a discharge shield 85 is mounted on the bearing drum. This shield as shown comprises preferably a hollow conical member with a closed end 86, the conical wall snugly fitting over the wall of the cup-shaped member 20 of the drum.

The parts of my blower are well adapted for manufacture of light material. When assembled, the shaft carrying the impeller is mounted in aligned ball bearings readily lubricated. The air forced in a helical course by the rotating blades is straightened by the straightening vanes and thus passes in a straight annular blast out of the discharge end of the shell about the shield 85, the narrow streamlined supports 30 interposing little obstruction to this blast. The result is that a comparatively light force applied to the shaft and rotating it at a high speed, may deliver a powerful blast out of the discharge end of the shell, which may be conducted by any suitable conduit according to the use desired.

Reference is made to my divisional application, Ser. No. 29,626, filed May 27, 1948, now abandoned, entitled "Impeller for Blowers and Turbines" for claims relating to the construction of the impeller per se.

I claim:

1. In a blower, the combination of a hollow shell, a drum within the same comprising two cup-shaped members with the edges of their walls overlapping, the outer member having notches in its edge, and stationary vanes between the drum and shell having lugs at their inner ends occupying recesses provided by said notches in the overlapped wall.

2. In a blower, the combination of a hollow shell having a cylindrical interior, a hollow drum within the shell concentric thereof, said drum having two substantially cylindrical walls end-to-end and overlapping each other, straightening vanes between the drum and shell having at their inner ends lugs extending into openings provided by notches in the end of the outer of said overlapping members, and lugs on the outer ends of the straightening vanes occupying openings in the shell.

JAMES G. SAWYER.

REFERENCES CITED

The following references are of record in the file of this patent:

UNITED STATES PATENTS

| Number | Name | Date |
|---|---|---|
| 775,108 | Elliott | Nov. 15, 1904 |
| 1,427,859 | Schmidt | Sept. 5, 1922 |
| 1,717,203 | Gottschalk | June 11, 1929 |
| 1,873,336 | Schmidt | Aug. 23, 1932 |
| 1,932,231 | Schmidt | Oct. 24, 1933 |
| 2,037,395 | Seelig | Apr. 14, 1936 |
| 2,099,566 | Lang | Nov. 16, 1937 |
| 2,191,341 | Curley | Feb. 20, 1940 |
| 2,323,456 | Curley et al. | July 6, 1943 |
| 2,328,038 | Taylor | Aug. 31, 1943 |
| 2,397,169 | Troller et al. | Mar. 26, 1946 |
| 2,398,140 | Teppner | Apr. 9, 1946 |

FOREIGN PATENTS

| Number | Country | Date |
|---|---|---|
| 226,402 | Great Britain | 1924 |